J. P. SCOVILL.
TOBACCO STEMMING MACHINE.
APPLICATION FILED SEPT. 23, 1913.
1,103,893.
Patented July 14, 1914.
3 SHEETS—SHEET 1.
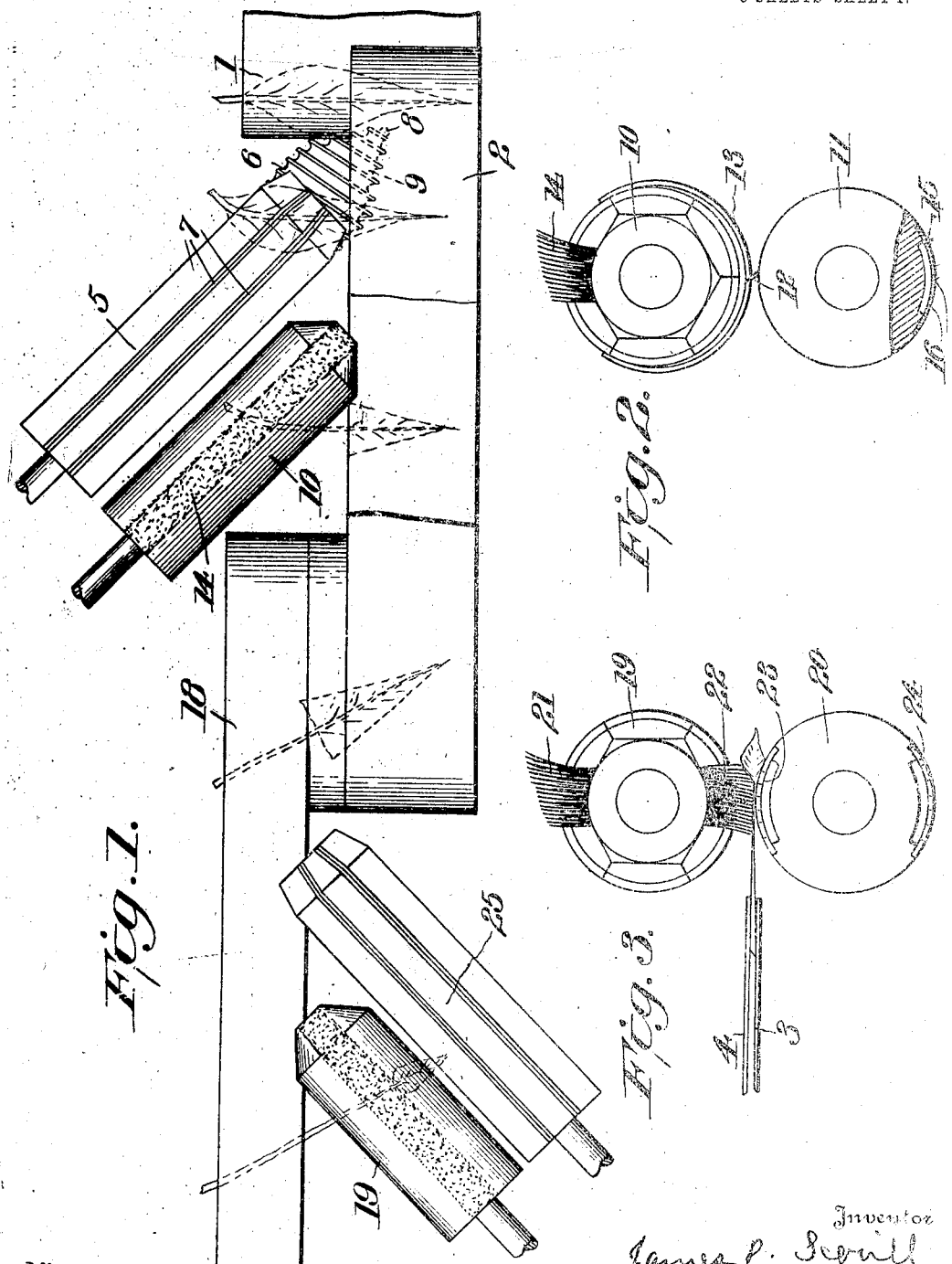

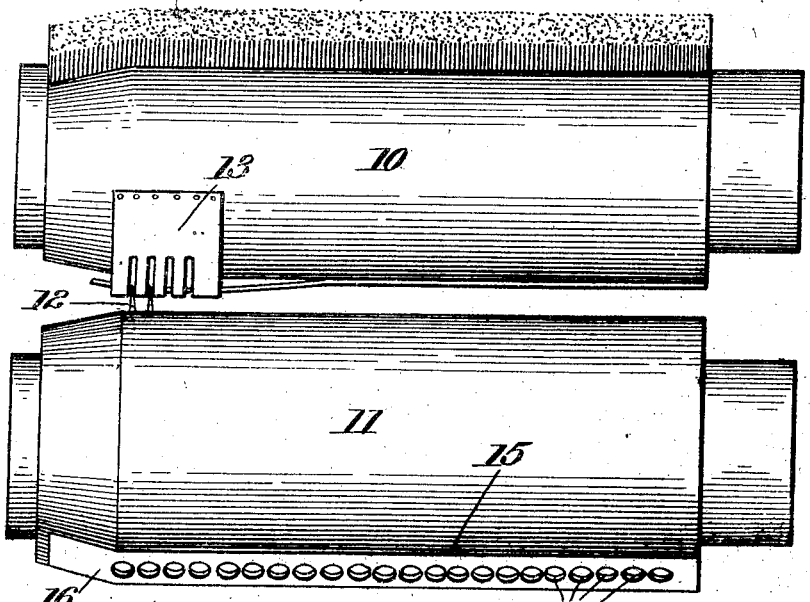
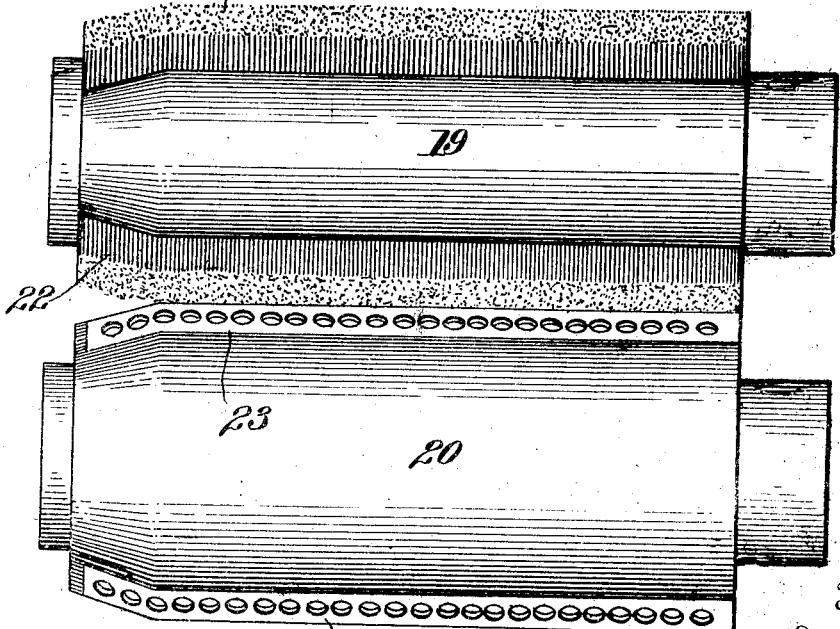

J. P. SCOVILL.
TOBACCO STEMMING MACHINE.
APPLICATION FILED SEPT. 23, 1913.
1,103,893.
Patented July 14, 1914.
3 SHEETS—SHEET 3.
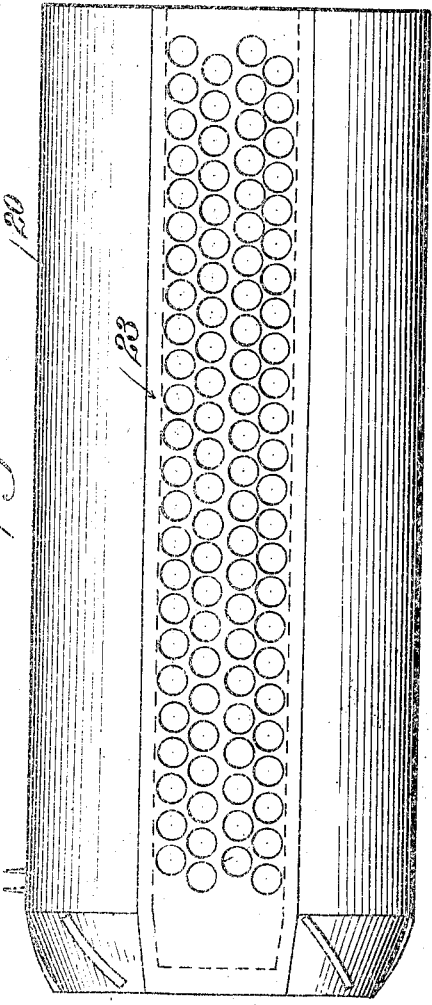
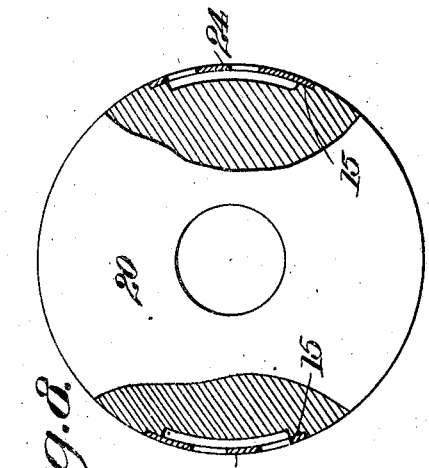
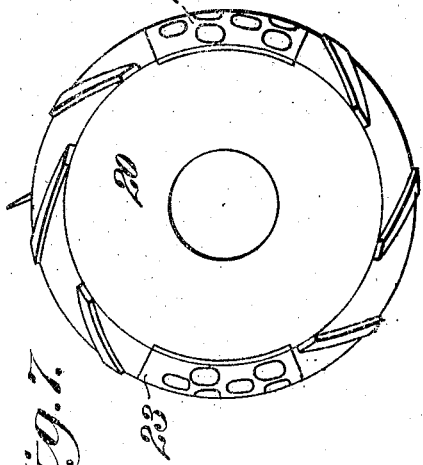

UNITED STATES PATENT OFFICE.

JAMES P. SCOVILL, OF TROY, NEW YORK, ASSIGNOR TO TROJAN MACHINE COMPANY, OF TROY, NEW YORK, A CORPORATION OF NEW YORK.

TOBACCO-STEMMING MACHINE.

1,103,893.

Specification of Letters Patent. Patented July 14, 1914.

Application filed September 23, 1913. Serial No. 791,269.

*To all whom it may concern:*

Be it known that I, JAMES P. SCOVILL, a citizen of the United States, and residing at Troy, in the county of Rensselaer and State of New York, have invented a new and Improved Tobacco-Stemming Machine, of which the following specification is a full disclosure.

This invention relates to a tobacco-leaf stemming machine embodying the principles of the invention disclosed and claimed in my prior Patents No. 1,067,147, patented July 8, 1913; No. 1,067,148 patented July 8, 1913 and No. 1,067,149 patented July 8, 1913.

The object of the present invention is to produce an improved or modified form of stripping mechanism particularly as to the characteristics of one of the roll components.

It is desirable to render available in connection with the ordinary machine, structurally differentiated interchangeable rolls having distinctive leaf attacking function. To exemplify, the longer the interval between the harvesting and the stemming of the leaf, the more tender it becomes. It is therefore advantageous to provide instrumentalities or operative conditions of sufficiently differentiated aggressiveness to approximate the leaf variation.

In the present invention, one of the rolls has one or more radially projecting flexible stripping elements or brush segments corresponding to one of the rolls of my prior Patent 1,067,149 of July 8, 1913, while the surface of the other roll is formed with one or more grid surfaces providing recessed areas to coöperate with the brush segment of the companion roll, the characteristic of which is the absence of appreciable radially projecting rigid members. The relatively countersunk surfaces of this new roll, regardless of their individual areas, form leaf-pockets or recessions into which the fiber of the opposing roll slightly impinges during the rotation which accentuates the counter-drag of the pair of rolls relative to the pull of the stem advancing carrier, without rendering the sharp leaf puncturing or vein severing action inherent in rigid radial projection from the roll working against the fiber. The effect of the co-action of the radial fiber element and the irregular surface of the companion roll, particularly where the operation is intermittent, produces a stripping influence effective in separating the leaf from the stem without appreciably cutting up the strips.

The features of the invention are more fully set forth in connection with the description of the accompanying drawings forming a part of this specification and disclosing the preferred embodiment of the present invention, in which—

Figure 1 is a plan view of the organized machine. Fig. 2 is an end elevation of the first pair of stripping rolls. Fig. 3 is an end elevation of the second pair of stripping rolls showing the relative disposition of the stem gripping carrier with the leaf diagrammatically indicated. Fig. 4 is a side elevation of the first pair of stripping rolls. Fig. 5 is a summary view of the second pair of rolls. Fig. 6 is a plan view of one of the rolls. Fig. 7 is an end view of the same roll. Fig. 8 is an end view partly in section of same roll.

In Fig. 1, 1 is the forward end of the feed belt mechanism, the feed belt delivers the leaf to a stem gripping carrier 2 comprising adjacent belt runs as indicated by reference numerals 3, 4 Fig. 3, a portion of the leaf being gripped between the element 3, 4, so that the leaf extends transversely relatively to the stem gripping carrier, the projecting end of the leaf to be stripped in the first operation.

It is desirable to discard or reject short or broken leaves so that they will not be delivered to stripping mechanism, and to effect this result I provide a first pair of rolls 5, 6 angularly disposed as to the carrier 2, placed in rear of the feed belt 1 and in front of the first pair of stripping rolls. The upper roll 5 is provided with axially extending flexible strips 7 projecting radially from the roll functioning as repelling instrumentalities, for the shorter or broken leaves, the direction of rotation of the rolls 5, 6 throwing out the undesirable product. The lower roll 6 is projected beyond the end of roll 5 and formed with a conical end 8 having a spiral way 9, leading from the conical end of this roll to the circumferential portion of the roll and thereby directing the leaf laterally to the influence of the repellers 7, so that all short or broken leaves are in this manner prevented from delivery to the stripping mechanism. The first pair of stripping rolls 10 and 11 are shown in detail in Figs. 2 and 4 it not being material which is the top and which is the bottom roll. The stripping rolls 10 and 11 are angularly disposed relative to the stem gripping carrier 2 and preferably formed with conical ends to provide ready leaf access between the rolls. The roll 11 is formed with a short row or rows of radially projecting spurs 12 to initially puncture or sever transversely of the stem, and said spurs operate in relation to a circumferential member 13 of roll 10, preferably a piece of belting, the opposite ends of which are fixed to the periphery of the roll leaving a medial loop portion appropriately slitted for coaction with the spurs 12. Roll 10 is provided with a radially projecting brush or fiber segment 14. The companion roll 11 has a portion of its periphery cut out as indicated at 15, the depression being covered and the peripheral roll surface completed by a plate 16 formed with perforations 17, the plate 16 extending longitudinally across the face of the roll. The irregular or recess surface thus formed registers with the brush segment 14 when the rolls are rotated, the extremities of the brush slightly impinging into the perforations 17 so that portions of the leaf are somewhat pocketed into these recesses, the effect being to sever the leaf adjacent the stem without cutting or mauling the rest of the leaf. In this preferred construction the space between the curved plate 16 and the floor of the cut out portion of the roll 15 provides clearance for leaf particles.

I provide a second stem gripping carrier 18 similar to the element 2 except that it is higher speeded, the front ends of the carrier 18 having an overlapping relationship to the rear end of member 2, parallel with and closely adjacent thereto. Operating in relation to the second stem gripping carrier 18 is a second pair of stripping rolls 19 and 20, disposed in relation to member 18 substantially as the stripping rolls 10 and 11 are disposed in relation to stem gripping carrier 2, except that the first rolls 10 and 11 are at the left of the carrier 2 and in front of the carrier 18 while the second stripping rolls 19 and 20 are at the right of carrier 18 and in rear of the stem gripping carrier 2. Preferably I form roll 19 with two brush segments 21, 22 and roll 20 with two co-acting perforated plates 23, 24 similar in construction to the formation of roll 11. Also preferably I place a pair of rejecting rolls 25 in front of rolls 19, 20 and at the rear end of the stem gripping carrier 2 so as to prevent undesirable product from being drawn between the stripping rolls 19, 20.

It will be understood that I preferably deliver the leaf to the carrier 2 with the butt ends projecting so as to be stripped by rolls 10, 11 in a direction counter to the leaf grain, and that the stripped butt end is caught by the stem gripping carrier 18 and advanced so that the tip end of the leaf, when released by the stem carrier 2 is drawn between the rolls 19, 20 stripping this end of the leaf in a direction generally lengthwise of the leaf grain or toward the tip. And it will be understood from the disclosures of my said prior patents that it is the relatively opposing influences of the belt pull and rotation of the stripping rolls which effects the separation of the leaf from the stem. The edges defined by the perforation 17 exert a cutting or rubbing action in conjunction with the brush segment which is effective in making the separation without injuring the strip, and without producing the action or effect rendered where spurs or rigid radial projections coöperate with the brush segment. Preferably also the major portions of the peripheral surfaces of the stripping rolls constitute non-stripping areas so that the action is imminent, serving not only to afford more ready access to the leaf between the rolls but preventing the leaf from entwining itself around the rolls or from being severed to any further degree than is necessary in separating the leaf from the stem.

It is quite obvious that this disclosure of inventive principle is susceptible of different structural embodiments and that the claims are to be so understood except where a specific structure is directly recited.

Having described my invention, I claim:—

1. In a tobacco leaf stemming machine, a pair of oppositely rotating rolls and means for drawing a leaf between them, one of said rolls having flexible members providing a yieldable leaf engaging surface and the other roll being formed with recessed areas coacting with the flexible yieldable surface.

2. In a tobacco leaf stemming machine, a pair of oppositely rotating rolls and means for drawing a leaf between them, one of said rolls having a brush segment and the coacting roll being formed with recessed areas operating in relation to the brush segment.

3. In a tobacco leaf stemming machine, a pair of oppositely rotating rolls and means for drawing a leaf between them, one of said rolls being formed with a brush segment, the other roll having a segmental portion of its peripheral surface formed with recessed areas coöperating with the brush segment when the rolls are rotated.

4. In a tobacco leaf stemming machine, a pair of oppositely rotating rolls and means for drawing a leaf between them, one of said rolls having a brush segment, the other roll having a metal piece upon its periphery perforated to form recessed areas and disposed to coact with the brush segment of the companion roll.

5. In a tobacco leaf stemming machine, a pair of oppositely rotating rolls and means for drawing a leaf between them, one of said rolls having members providing a yieldable leaf engaging surface, the companion roll being formed with a peripheral countersunk surface, and a perforated plate covering said cut out portion and completing the peripheral surface of the roll and disposed to coact with the yieldable surface.

6. In a tobacco leaf stemming machine, a pair of oppositely rotating rolls, and means for drawing a leaf between them, one of said rolls being formed with radially projecting flexible stripping members, the other roll being formed with a grid peripheral surface providing recessed areas, said surfaces and members coacting to sever the leaf from the stem without injuring the strip.

7. In a tobacco leaf stemming machine, in combination with a stem gripping carrier and stripping roll, mechanism for rejecting short or broken leaves disposed in front of the stripping roll and comprising a roll formed with flexible radial repellers and a roll having a conical end formed with a spiral way for directing the leaf laterally away from the stem gripping carrier and into the operative zone of the radial repeller.

In witness whereof, I hereunto subscribe my name, as attested by the two subscribing witnesses.

JAMES P. SCOVILL.

Witnesses:
JOHN J. McKEON,
MATILDA K. BUSKIN.